United States Patent [19]

Sandhu

[11] Patent Number: 4,679,436
[45] Date of Patent: Jul. 14, 1987

[54] RECIPROCATING METHOD AND APPARATUS FOR PRODUCING UNIFORM ULTRASONIC FIELD FOR USE IN LIQUID CRYSTAL BASED ACOUSTICAL IMAGING

[75] Inventor: Jaswinder S. Sandhu, Buffalo Grove, Ill.

[73] Assignee: Raj Technology, Inc., Morton Grove, Ill.

[21] Appl. No.: 893,253

[22] Filed: Aug. 5, 1986

[51] Int. Cl.4 ............................................. G01N 29/00
[52] U.S. Cl. ........................................ 73/603; 350/330
[58] Field of Search ................ 73/606, 607, 602, 603; 350/330

[56] References Cited

U.S. PATENT DOCUMENTS

| | | | |
|---|---|---|---|
| 3,831,434 | 8/1974 | Greguss | 73/603 |
| 4,338,821 | 7/1982 | Dion | 73/603 |
| 4,379,408 | 4/1983 | Sandhu | 73/603 |
| 4,393,712 | 7/1983 | Sandhu | 73/603 |
| 4,506,550 | 3/1985 | Sandhu | 73/603 |
| 4,530,242 | 7/1985 | Sandhu | 73/603 |

OTHER PUBLICATIONS

P. N. T. Wells, *Physical Principles of Ultrasonic Diagnosis*, Academic Press, 1969, p. 54.
G. L. Gooberman, *Ultrasonics Theory and Application*, English University Press Printing, 1968, p. 34.

*Primary Examiner*—Howard A. Birmiel
*Attorney, Agent, or Firm*—Hill, Van Santen, Steadman & Simpson

[57] ABSTRACT

There is disclosed herein an apparatus and method for producing a substantially uniform acoustic field for use with a liquid crystal cell to produce a substantially artifact-free image of an object. The apparatus and method include moving an ultrasonic transducer toward and away from an object, a distance effective to cause adjacent constructive and destructive zone patterns to in effect overlie each other. The period of reciprocation is less than the time for onset of image decay, but greater than the image rise time so as to assure image formation. In addition, the frequency and/or phase of the acoustic energy can be varied so as to further enhance the image.

Electro-mechanical and piston driven embodiments are disclosed for reciprocating the transducer.

25 Claims, 19 Drawing Figures

RECIPROCATING METHOD AND APPARATUS FOR PRODUCING UNIFORM ULTRASONIC FIELD FOR USE IN LIQUID CRYSTAL BASED ACOUSTICAL IMAGING

BACKGROUND OF THE INVENTION

This invention relates to the acoustic imaging of objects using a liquid crystal cell, and more particularly, to an improved sound source for use in such imaging.

The use of ultrasonics to nondestructively and noninvasively inspect objects for internal discontinuities, internal features, irregular shapes, etc., is known in the industrial fields and medical fields.

In one form, ultrasonic imaging is accomplished using electronic displays in which the ultrasonic signal is electronically detected (for example by a piezoelectric detector) and the image is electronically enhanced.

In another form, the ultrasonic image is detected and displayed using a liquid crystal cell or display which includes a layer of liquid crystal material encapsulated between a pair of cover plates. See, for example, Greguss, U.S. Pat. No. 3,841,434 and Dion, U.S. Pat. No. 4,338,821. Improvements in such cells are disclosed in Sandhu, U.S. Pat. No. 4,379,408.

Liquid crystal systems may be preferred as they are less complex and they do not require complicated signal processing in order to produce an image.

These ultrasonic liquid crystal systems include a sound source which generates an ultrasonic beam or acoustic field, which is directed at an object and insonifies the object. The liquid crystal cell detects the acoustic energy which passes through the object or is reflected from internal features of the object and displays an image.

The insonifying acoustic field may not be uniform, and as a result, the image may exhibit undesirable artifacts due to intensity variations in the plane of the cell. These intensity variation artifacts are believed to be due to constructive and destructive interference of the waves in the ultrasonic beam, which are often referred to as Fresnel or Fraunhofer patterns.

Commercial ultrasonic transducers include a piezoelectric plate, usually the face plate, which is electrically excited for producing the acoustic energy or an ultrasonic beam. These transducers direct the generated energy along a path generally normal to the face plate toward the object to be insonified. Energy exciting or reflected from the object is detected by and displayed on a liquid crystal cell. If the beam is viewed in cross section and at different distances from the transducer or face plate with a liquid crystal cell, the beam exhibits areas of high and low intensity. In the near field these are sometimes referred to as Fresnel patterns. The patterns differ with distance from the transducer face with piezoelectric element geometry and with the electrode pattern on the piezoelectric element. These patterns are believed to be formed by the constructive and destructive interference of acoustic waves from the transducer. See *Physical Principles of Ultrasonic Diagnosis,* by P. N. T. Wells, Academic Press 1969 at page 54 for a diagram showing such patterns, the distance between patterns and the correspondence of the intensity maximas and minimas along the central axis. These intensity variations appear as artifacts which are superimposed on, or imposed over, the image of the cell, thereby degrading the image quality.

Prior sound sources or transducers include: stationary transducers; sequentially activated or excited transducer arrays (e.g., phased arrays or linear arrays, etc.); transducers which are movable (e.g. by rotation) in a plane normal to the beam path; and transducers in which frequency and phase are controlled to render the beam and image more uniform. These prior sound sources are suitable for use in particular systems, such as pulse echo imaging, but may not be as suitable or useful in systems where highly attenuative objects are to be imaged using liquid crystals.

It is therefore an object of this invention to provide a system for producing a strong and uniform acoustic field for the insonification of objects and for use in displaying images on a liquid crystal cell.

It is a further object to eliminate or minimize the effect of constructive and destructive interference patterns caused by the sound source.

It is yet another object to minimize undesirable superpositions appearing in a liquid crystal detector cell.

Still another object is to provide a sound source particularly for use in imaging highly attenuative objects with liquid crystals.

These and other objects of this invention will become apparent from the following disclosure and appended claims.

SUMMARY OF THE INVENTION

There is provided by this invention a method and apparatus for producing a strong and uniform ultrasonic field for use in producing an image of an insonified object on a liquid crystal display cell, which image is substantially free of image artifacts due to the intensity variations from the source.

The field is produced by providing a sound source which moves or reciprocates in the direction of the object so as to minimize the effect of constructive and destructive interference at the cell over a period of time. The constructive and destructive patterns or Fresnel patterns are, in effect, averaged at the cell as the sound source is reciprocated. Thus it is believed that in a given plane, the patterns produced by the reciprocating source will provide an average uniform beam.

Physically the ultrasonic transducer is reciprocated by electro-mechanical means or fluid-driven piston means so as to, in effect, reciprocate the field with time.

This system is particuarly suitable for use with liquid crystal display cells which respond to acoustic intensity. The rate of reciprocation, and thus field change, is related to the rise and decay or response time associated with the image formation by the liquid crystal cell. More specifically, the period of reciprocation or field change must be longer than the image formation or rise time, but shorter than the image decay time, so as to achieve the desired averaging and assure a substantially continuous flicker-free image. The distance of reciprocation is related to the distance between adjacent zone patterns and is desirably chosen to be small.

Further improvements in the image are achieved by utilizing phase and frequency scanning techniques in combination with the reciprocation.

DESCRIPTION OF THE PREFERRED EMBODIMENT

Figure 1:
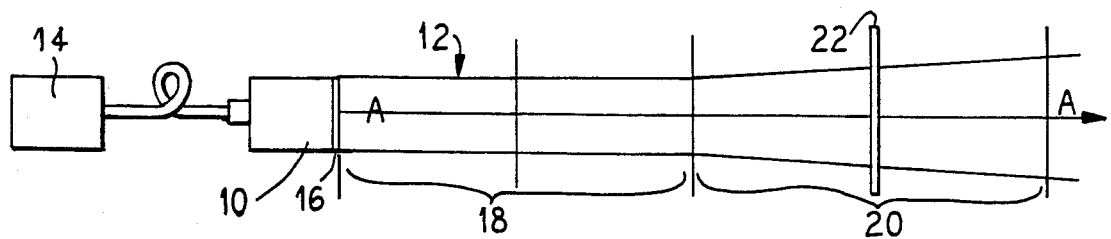
FIG. 1 is an elevational and diagrammatic view of a stationary prior art transducer and the acoustic field.

Referring now to the drawings, FIG. 1 shows a prior art stationary ultrasonic transducer 10, which emits acoustic energy or an ultrasonic beam along a radiation axis A—A which can be depicted as a field 12. The transducer is of the piezoelectric type having an appropriate power supply 14 for driving the piezoelectric face plate 16. These transducers can be purchased commercially and are normally available for operation at frequencies between 1 and 10 megahertz.

The field can be considered to be separated into a near field zone 18 and a far field zone 20. The liquid crystal cell 22 is shown positioned in the far field zone. The length of the near field, or the distance from the transducer to the near field/far field transition is calculated from the relationship $R^2/\lambda$, where R is the transducer radius and $\lambda$ the acoustic energy wavelength in the propagating medium.

If a liquid crystal cell is positioned at different points along the radiation axis, different patterns are visualized in the cell. FIGS. 2a–2h show the field or zone patterns as the distance along the radiation axis or from the transducer face increases. FIGS. 2a–2e show the wave patterns in the near field; FIG. 2f show the wave patterns at the near field/far field transition; and FIGS. 2g and 2h show the wave pattern in the far field.

The patterns in the near field are referred to as Fresnel rings and in the far field as Fraunhofer zone patterns. In these figures the dark color represents high acoustic intensity and the clear area a low acoustic intensity.

Figure 2A:
FIGS. 2a–2h are diagrammatic views showing wave patterns of the prior art transducer at various distances from the radiating face of the transducer.
Figure 2B:
Figure 2C:
Figure 2D:
Figure 2E:
Figure 2F:
Figure 2G:
Figure 2H:

FIG. 2a shows three dark concentric rings. FIG. 2b shows a dark central spot, two dark rings, and a broadening of the outer ring. FIG. 2c shows two dark cocentric rings. FIG. 2d shows a dark center spot and one dark outer ring. FIG. 2e shows one dark broad ring. At the near field/far field transition, FIG. 2f, the pattern is a single dark spot with no rings. In the far zone, FIGS. 2g and 2h, the pattern is a single center spot where the intensity is greatest at the center and decreases outwardly from the center.

As indicated above, it is believed that the rings are due to constructive and destructive interference of the wave fronts emanating from the transducer face. It will be noted that the center of each pattern in the near field alternates or changes from clear to dark, and so on, as seen in FIGS. 2a to 2e. Also, the ring patterns change from three (FIG. 2a) to two (FIGS. 2b and 2c) to one (FIGS. 2d to 2e).

Figure 3:
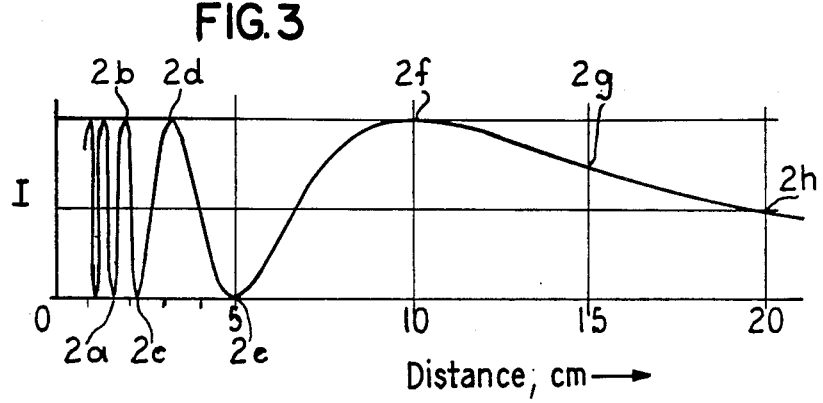
FIG. 3 is a diagrammatic view showing the distribution of acoustic energy along the central radiation axis normal to the transducer face, and the relationship to wave patterns.

The patterns shown represent maximas and minimas of the acoustic energy distribution along the radiation axis A—A shown in FIG. 3, where intensity (I) is plotted against distance from the transducer face. This diagram is found in *Physical Principles of Ultrasonic Diagnosis, id.,* and is similar to the diagram in *Ultrasonic Theory and Application,* G. L. Gooberman, English University Press Printing 1968. The central position of the patterns of FIGS. 2a to 2h are referenced on FIG. 3, in relation to maximas and minimas. It can be seen that the distance between maximas and minimas varies and is closest nearest the transducer and increases outwardly therefrom. Thus the distance between patterns is not equal and generally increases with the distance from the transducer face.

It is believed that uniform patterns, as viewed on the liquid crystal cell, can be produced by moving or reciprocating the sound source in such a manner as to cause adjacent wave patterns to effectively overlie each other. For example, the transducer can be moved to the right to cause the pattern of FIG. 2a to overlie that of FIG. 2b, or FIG. 2b to overlie FIG. 2c, or FIG. 2c to overlie FIG. 2d, etc. In such a situation, the open center of 2a would overlie the closed center of 2b. Furthermore, the dark rings of 2b will overlie the clear rings of 2a. The transducer can be moved or reciprocated to the left so that the patterns would again overlie each other as, for example, 2b would overlie 2a. Again, the dark rings and spots would overlie, and in a sense, fill the clear rings and spots.

When such overlying of patterns is viewed on a liquid crystal cell, an effectively averaged, uniform and intensity variation artifact-free image is produced, absent the light and dark areas. This is because the liquid crystal cell responds to intensity.

The transducer shown herein has a flat circular face. However, other shaped transducers, such as square, rectangular, hexagonal and the like can be used. Furthermore, the transducer face also can be shaped or curved rather than flat. Regardless of shape or profile, the transducer will exhibit an intensity variation distribution in the radiation direction.

The distance of reciprocation is determined by the distance between adjacent patterns. In general it is desirable to minimize the reciprocation distance or stroke for various mechanical reasons and to provide flexibility in object and cell positioning. In other words, a short stroke is generally more desirable than a long stroke from a mechanical and acoustic point of view. This is done by selecting patterns adjacent the transducer since the distance between patterns is closest adjacent the transducer face and increases with distance from the face.

For example, for a one inch diameter transducer operating at 3.5 MHz, the approximate distances from the transducer face to the maximas and minimas corresponding to the wave patterns of FIGS. 2a, 2b, and 2c are as follows:

| Distance | Figure |
| --- | --- |
| 6.22 cm | 2a |
| 7.50 cm | 2b |
| 9.40 cm | 2c |

Thus the length of the transducer stroke would be the distance between FIGS. 2a and 2c, or about 3.2 centimeters. The cell or object would be positioned at the center point of the stroke or about 7.8 centimeters from the transducer so as to be exposed to the patterns of FIGS. 2a, 2b and 2c. Closer positioning is possible by selecting patterns even closer to the transducer face, which would further minimize stroke distance. Short strokes are more easily mechanically implemented and may be more desirable acoustically.

Figure 4:
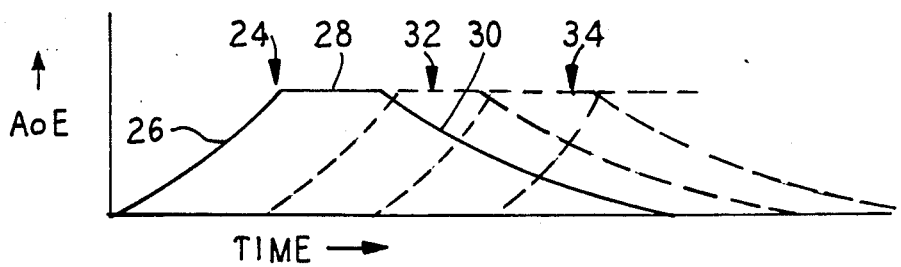
FIG. 4 is a graphic representation of a series of acoustic characteristic curves for a liquid crystal cell showing rise and decay of the image.

Liquid crystal cells exhibit acousto-optic characteristics of the type shown in FIG. 4, where the acousto-optic effect (AOE) at a given intensity is plotted against time. The first curve 24 includes an image formation and rise time 26, an imaging residence time 28, and an image decay time 30. Additional curves 32 and 34 are also shown. The rate or period of reciprocation is determined in relation to these curves. Desirably the transducer is reciprocated one full cycle in a period of time less than the time in which the image begins to decay. In other words, the period for reciprocation is less than the time in which the image begins to decay. The maximum rate of reciprocation is governed by the mass and construction of the reciprocation means and the image rise time. Desirably the rate for reciprocation is greater than the rise time, but less than the onset of decay. In this manner the cell is operating on the residence range at all times. The curves 32 and 34 show the onset of imaging as new cycles begin and demonstrates the timing for continuity of the image.

Figure 5:
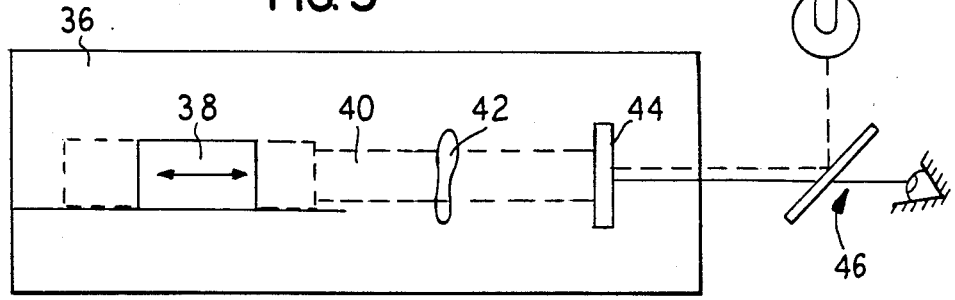
FIG. 5 is a diagrammatic view of a transmission-type liquid crystal imaging system using a reciprocable transducer.

Apparatus for reciprocating the transducer is shown in FIGS. 5-8. The reciprocating transducer can be used in either the transmission or reflection mode. In the transmission mode, as shown in FIG. 5, a water bath 36 is provided in which the reciprocating transducer 38 is positioned. The ultrasonic beam 40 emitted by the transducer is directed toward an object 42 to be inspected. The acoustic or ultrasonic energy passes through the object and is detected and displayed on the cell 44. The image is then viewed using a conventional optics assembly 46, which includes components such as a light source, half-silvered mirror, filters, polarizers, and analyzers. The system is of the transmission type as the ultrasound is transmitted directly through the object to the liquid crystal cell.

Figure 6:
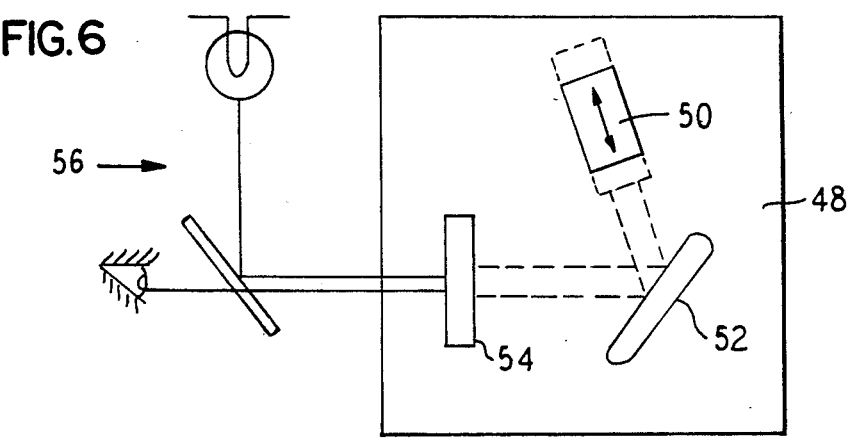
FIG. 6 is a diagrammatic view of a reflective-type liquid crystal imaging system using a reciprocable transducer.

FIG. 6 shows the reflective system which includes a bath 48, a reciprocating transducer 50, and an object 52. Ultrasound from the transducer insonifies the object and ultrasound is reflected to a liquid crystal cell 54 where the ultrasound is detected and the image is displayed. The cell is viewed using the optics assembly 56, which is similar to the assembly 46.

Figure 7:
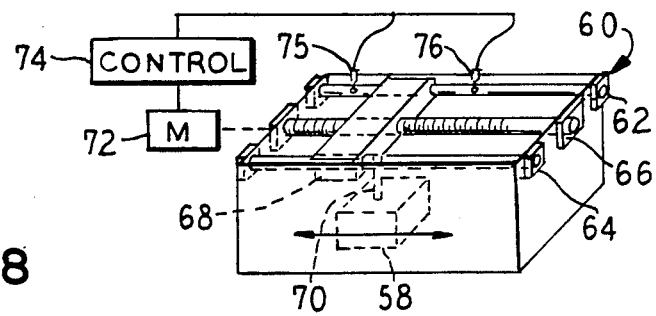
FIG. 7 is a perspective view showing a bridge-type construction for use with an electro-mechanically reciprocable transducer.

In an electro-mechanical system as in FIG. 7, the transducer 58 is suspended from a bridge system 60 for reciprocation. The bridge system includes bearing rods 62 and 64 and a rotatable drive screw 66. An internally-threaded and driven block or carriage 68 receives and rides along the drive screw 66 and rods 62 and 64 and supports the suspension member 70 to which the reciprocable transducer 58 is secured.

The drive screw 66 is driven by a reversible electric motor 72, which is controlled by controller 74 and position sensing limit switches 75 and 76. By this assembly the transducer 58 is moved in a forward direction until it engages a limit switch, such as 75, through control 74, which reverses the drive motor 72, rotation of screw 66, and thus the direction of tranducer movement. When the block or carriage 68 engages limit switch 75, its direction is again reversed.

Figure 8:
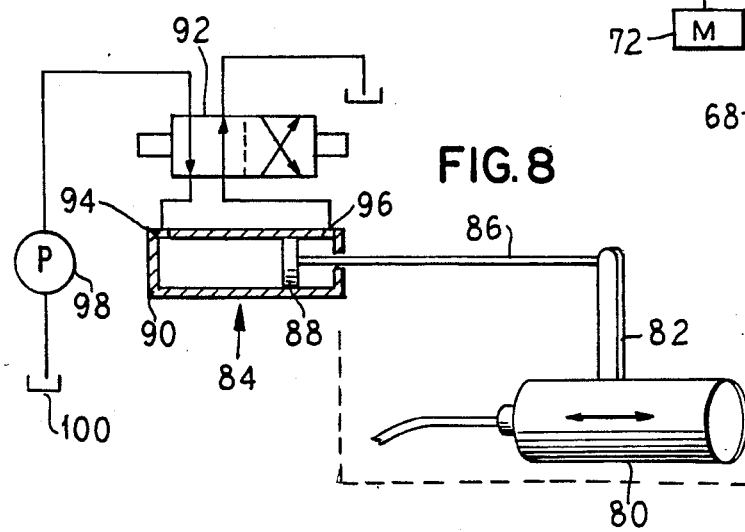
FIG. 8 is a diagrammatic view showing a piston system for reciprocating the transducer.

In another embodiment as shown in FIG. 8, there is provided a piston-type driving and reversing system. The transducer 80 has a connector 82, which is rigidly connected to the piston assembly 84. The assembly includes a piston rod 86 attached at one end to the connector 82 and having a piston 88 at the other end which is movable in the cylinder 90. The piston assembly can be either pneumatic or hydraulic and is operated via the control valve 92 and the cylinder ports 94 and 96 that are selectively used as inlet or outlet ports to cause the piston to reciprocate, and thus the transducer. A appropriate pump 98 and if necessary hydraulic reservoir such as 100 are provided.

The foregoing are only intended as exemplary of the electro-mechanical fluid drive system or other systems that can be used to reciprocate a transducer.

Figure 9:
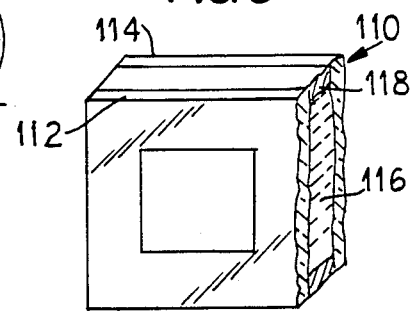
FIG. 9 is a diagrammatic view of a liquid crystal cell.

There is shown in FIG. 9 a cell 110 having a pair of acoustically transparent plates or cover members 112 and 114, at least one of which is optically transparent. A liquid crystal layer 116 is of a material such as K-15 (which is chemically identified as 4-cyano-4'n-pentylphenyl) and is encapsulated between the plates by a peripheral spacer 118. The thickness if the liquid crystal layer may be between 5 and 200 microns.

As an example, the field produced by a one inch diameter ultrasonic transducer operating at 3.5 MHz can be viewed on liquid crystal cell having a rise time of one second and decay of five seconds. The transducer can be reciprocated a distance of 0.5 centimeters at the rate of one cycle per five seconds. The cell would exhibit a substantially uniform and substantially artifact-free image. By so reciprocating the transducer, adjacent Fresnel zones or patterns (such as FIGS. 2a, 2b and 2c) would be caused to effectively overlie each other so as to minimize itensity-variation image artifacts. The period of reciprocation would be less than the decay time, greater than the rise time and provide a substantially continuous flicker-free image.

However, it is to be appreciated that specific operating characteristics are to be matched to the specific cell and transducer.

Further improvements in imaging can be realized by controlling the phase and frequency of the transducer operation during reciprocation. The frequency can be scanned about 3.5 MHz, for example, between 3.2 and 3.8 MHz in a period of 0.1 second. In addition, the phase can be varied between 0° and 360° in a period of 0.1 second. The frequency and phase can be scanned independently or simultaneously.

Figure 10:
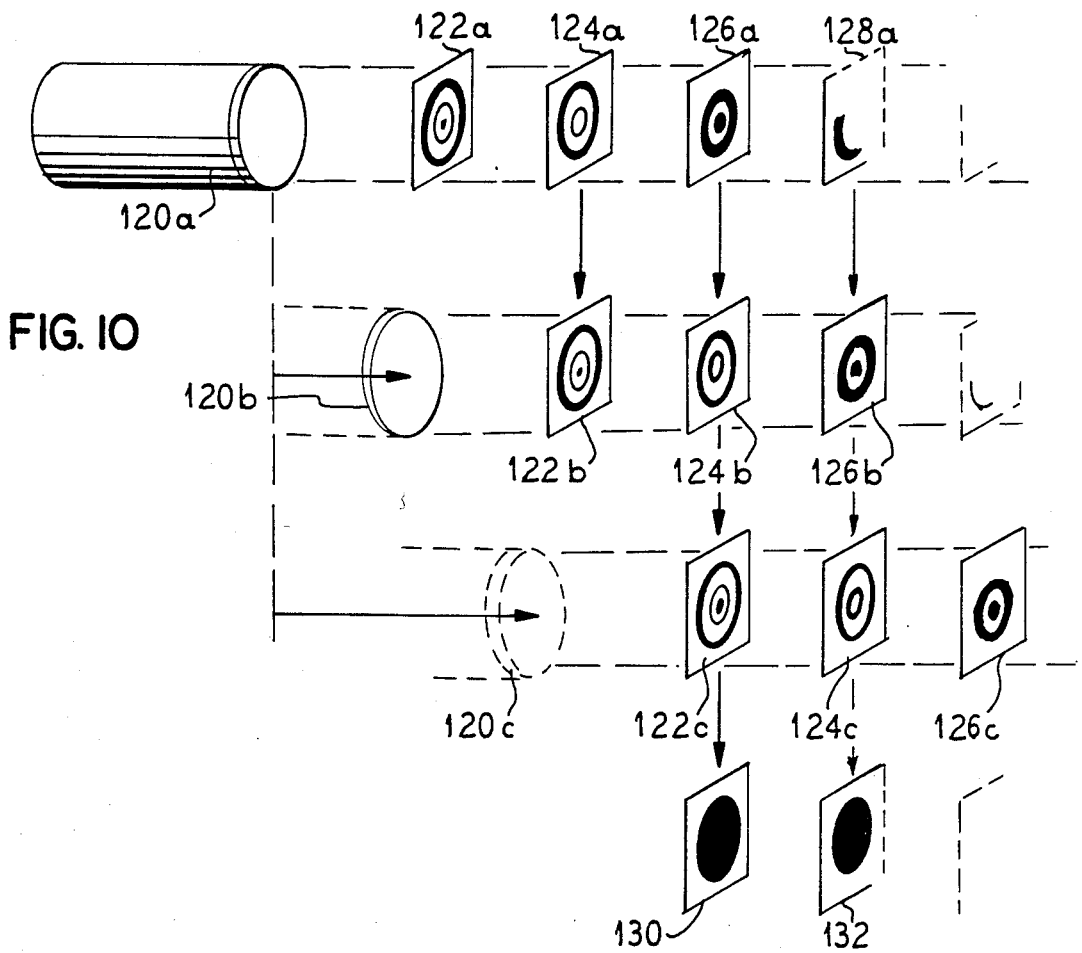
FIG. 10 is a diagrammatic view showing reciprocated positions of a transducer, the positions of zone patterns and the averaging effect.
Figure 11:
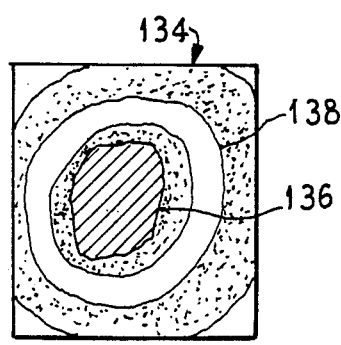
FIG. 11 shows a cell in which the image was formed with a stationary transducer showing image artifacts due to intensity variations.
Figure 12:
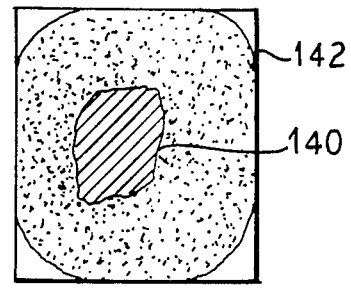
FIG. 12 shows a cell in which the image was formed with a reciprocating transducer without image artifacts.

Referring now to FIGS. 10-12, the effect of reciprocation is graphically depicted. In FIG. 10 a transducer is shown in three positions 120a, 120b, and 120c. Position 120b can be considered the center position and 120a and 120c the ends of reciprocation. In position 120b, three zone patterns or Fresnel rings 122b, 124b and 126b are shown. Similar zone patterns are shown at 122a, 124a, 126a, 128a, 122c, 124c and 126c. The effect of viewing all of these patterns at a point with a liquid crystal cell is shown at 130 and 132. At 130 the patterns of 126a, 124b and 122c are averaged to provide a uniform beam image. At 132 the patterns 128a, 126c and 124c have been averaged to provide a uniform beam. The cell 134 in FIG. 11 shows the image of an object insonified using a prior art transducer. The object image 136 and image artifacts 138 are seen. In FIG. 12 the same object is shown but insonified using a reciprocating transducer. There the object image 140 and the background are seen displayed on cell 142. The image as shown is substantially free of intensity-variation artifacts. Thus a substantially artifact-free image is produced on a liquid crystal cell using a reciprocating transducer to produce an effectively averaged uniform beam.

Although the invention has been described with respect to preferred embodiments, changes and modifications can be made which are within the full intended scope of the invention as defined by the appended claims.

I claim as my invention:

1. An apparatus for producing a substantially uniform acoustic field for use in producing an image on a liquid crystal display cell, where the display cell includes a layer of liquid crystal material disposed and encapsulated between a pair of cover members, said apparatus comprising:

transducer means for producing acoustic energy and for radiating the acoustic energy therefrom in a direction toward an object, and means for moving said transducer means toward and away from said object at a rate so as to produce said substantially uniform acoustic field.

2. An apparatus as in claim 1, wherein the image on the cell is substantially free of undesirable artifacts, and each of the cover members is substantially acoustically transparent.

3. An apparatus as in claim 1, wherein said transducer means has a substantially planar surface for generating the acoustic energy and from which said energy is emitted, and said transducer means emits said energy in a direction generally normal to said surface.

4. An apparatus as in claim 1, wherein said transducer radiates energy which exhibits a plurality of intensity patterns along a radiation axis and said moving means is constructed to move a distance at least equivalent to the distance between selected adjacent patterns so as to cause said patterns to effectively overlie each other.

5. An apparatus as in claim 4, wherein said moving means is constructed to move a distance substantially equal to the distance between three adjacent patterns so as to cause said patterns to overlie each other.

6. An apparatus as in claim 5, wherein one of said object and said cell is positioned between the first and last of said patterns.

7. An apparatus as in claim 4, wherein each of said patterns corresponds to an intensity maxima or minima.

8. An apparatus as in claim 6, wherein said patterns are closely spaced to said transducer means.

9. An apparatus as in claim 1, wherein said moving means is constructed to move said transducer at a rate effective to produce a substantially continuous flicker-free image.

10. An apparatus as in claim 9, wherein said cell exhibits an image rise time and an image decay time and said moving means is constructed to move said transducer means in a period greater than the rise time but less than the decay time.

11. An apparatus as in claim 3, wherein said moving means includes reciprocable drive means operatively associated with the transducer means for reciprocating said transducer means along an axis substantially normal to said surface.

12. An apparatus as in claim 11, wherein said reciprocable drive means includes bridge means for suspending said transducer means and for movement toward and away from said object, drive means for moving said bridge means and control means associated with said drive means and bridge means for selectively controlling movement in each of said directions toward and away from said object.

13. An apparatus as in claim 11, wherein said drive means includes piston means which is operatively connected to said transducer means for moving said transducer means toward and away from said object.

14. An apparatus as in claim 1, further including means operatively associated with said transducer means for controllably varying at least one of the frequency and the phase of said acoustic energy produced by said transducer means.

15. An apparatus as in claim 1, wherein said liquid crystal cell is arranged for receiving acoustic energy transmitted through an object.

16. An apparatus as in claim 1, wherein said liquid crystal is arranged to receive acoustic energy reflected from an object.

17. A method for producing a substantially uniform acoustic field and an image of an object on a liquid crystal cell, which cell includes a layer of liquid crystal material disposed and encapsulated between a pair of cover means, said method comprising the steps of:

generating acoustic energy and emitting acoustic energy in a direction toward an object so as to insonify the object, said field exhibiting constructive and destructive interference patterns along its length; and moving said transducer field toward and away from said object in the direction of radiation so as to cause constructive and destructive patterns to effectively overlie each other and produce a substantially uniform acoustic field.

18. A method as in claim 17, wherein said method produces a substantially artifact-free image of an object and each of said covers members is substantially acoustically transparent.

19. A method as in claim 17, wherein said acoustic energy is generated by ultrasonic transducer means and said transducer means includes a surface from which the acoustic field is radiated substantially normal to said face, and said transducer means is reciprocated along an axis substantially normal to said face a distance effective to cause constructive and destructive interference patterns to overlie each other and at a rate to produce a substantially flicker-free image on said cell.

20. A method as in claim 17, including the further step of controllably varying at least one of the frequency and the phase of the acoustic energy.

21. A method of producing a substantially uniform acoustic field for use in imaging an object on a liquid crystal detector cell so as to produce a substantially artifact-free image of said cell, said cell including a layer of liquid crystal material disposed and encapsulated between a pair of acoustically transparent cover members comprising the steps of:

providing a reciprocable ultrasonic transducer for emitting acoustic energy toward an object to be insonified; and reciprocating the transducer in the direction of the object across a distance and at a rate effective to produce a substantially uniform field.

22. A method as in claim 21, wherein said liquid crystal cell exhibits an image decay time and the period for reciprocation is less that onset of image decay.

23. A method as in claim 22, wherein the cell exhibits an image rise time and the period of reciprocation is greater that the image rise time.

24. A method as in claim 22, wherein said acoustic energy forms a field which exhibits zone patterns of constructive and destructive interference and the distance of reciprocation is effective to cause zone patterns to in effect overlie each other so as to produce a substantially uniform beam and a substantially artifact-free image.

25. A method as in claim 23, including the further step of controllably varying at least one of the frequency and the phase of the acoustic energy.

* * * * *